United States Patent [19]
Fukui et al.

[11] Patent Number: 5,179,650
[45] Date of Patent: Jan. 12, 1993

[54] METHOD AND APPARATUS FOR EDITING DOCUMENTS

[75] Inventors: Mika Fukui, Yokohama; Isamu Iwai, Kawasaki; Miwako Doi, Kawasaki; Yoichi Takebayashi, Yokohama, all of Japan

[73] Assignee: Kabushiki Kaisha Toshiba, Kawasaki, Japan

[21] Appl. No.: 860,119

[22] Filed: Mar. 31, 1992

Related U.S. Application Data

[63] Continuation of Ser. No. 670,481, Mar. 15, 1991, abandoned, which is a continuation of Ser. No. 299,337, Jan. 23, 1989, abandoned.

[30] Foreign Application Priority Data

Jan. 21, 1988 [JP] Japan .................................. 63-9586

[51] Int. Cl.⁵ .......................................... G06F 15/20
[52] U.S. Cl. .................................... 395/148; 395/147
[58] Field of Search .............................. 395/144–149; 358/403

[56] References Cited

U.S. PATENT DOCUMENTS

| | | | |
|---|---|---|---|
| 4,538,183 | 8/1985 | Kanno et al. | 364/523 X |
| 4,604,653 | 8/1986 | Shimizu | 358/403 |
| 4,608,664 | 8/1986 | Bartlett et al. | 364/523 X |
| 4,641,197 | 2/1987 | Miyagi | 364/523 X |
| 4,755,955 | 7/1988 | Kimura et al. | 395/148 |

FOREIGN PATENT DOCUMENTS

| | | | |
|---|---|---|---|
| 0123109 | 10/1984 | European Pat. Off. | 364/523 |
| 0250677 | 1/1988 | European Pat. Off. | |
| 61-21570 | 1/1986 | Japan | |

OTHER PUBLICATIONS

Using Microsoft WORD, Microsoft Corporation 1986, pp. 51–70, 293–318.

I. Iwai et al., "Extraction of Document Architectures in a Document Processing System", Proc. 34th General Conf. Jap. Society Information Processing, pp. 1309–1310.

Patent Abstracts of Japan, vol. 9, No. 304, Nov. 30, 1985, Japanese Application No. 60-136861.

Primary Examiner—Heather R. Herndon
Attorney, Agent, or Firm—Foley & Lardner

[57] ABSTRACT

An apparatus and method for editing a document to automatically produce a satisfactory, well ordered layout which includes the steps of (a) extracting characteristic quantities which characterize different elements of the document; (b) deriving relationships among the different elements of the document in accordance with the characteristic quantities; (c) determining a layout of the different elements of the document in accordance with the relationships; and (d) processing the document in accordance with the layout.

24 Claims, 16 Drawing Sheets

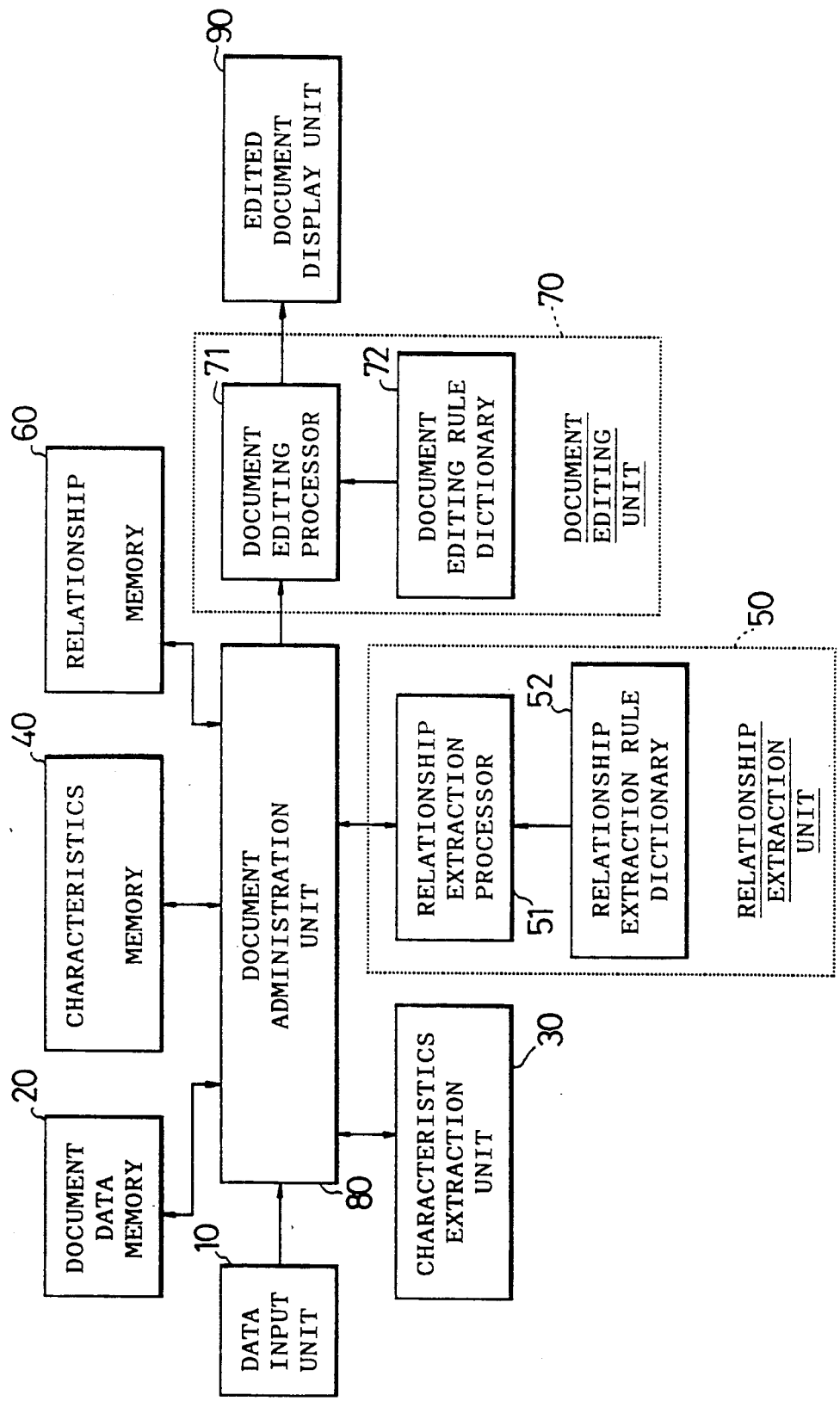

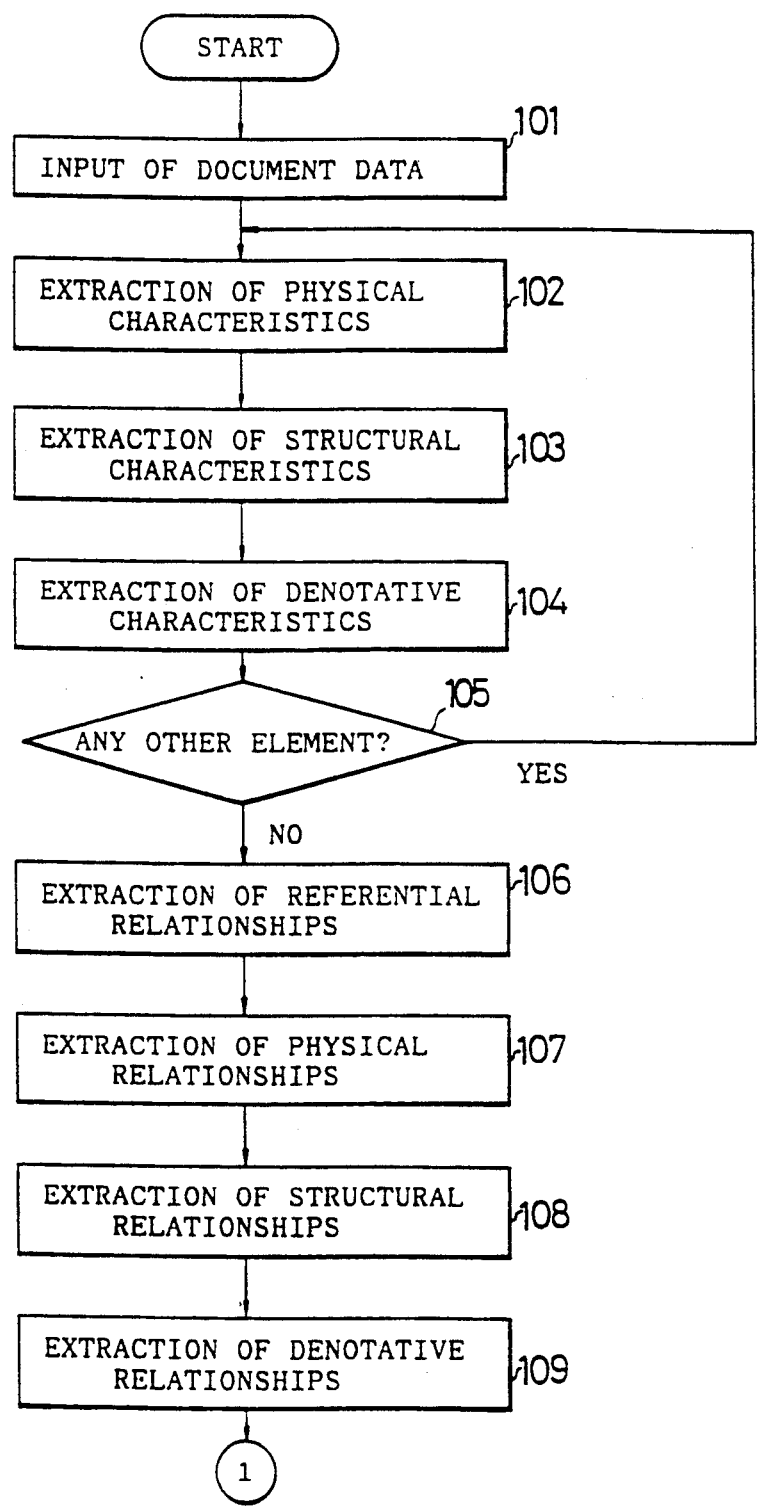

FIG.3A

```
         ELEMENT-1                      LINE NO.
    A STUDY ON ○○○○  ↵           ········ 1
   ×××  CO. LTD.↵                ········ 2
  TARO YAMADA   JIRO KANDA ↵     ········ 3
       ⋮                              ⋮
1. INTRODUCTION ↵                ········ 6
       ⋮
2. METHOD ↵                      ········ 9
       ⋮
3. RESULT ↵                      ········ 17
   3.1  A CASE OF METHOD 1↵      ········ 18
       ⋮
   The result is shown in Fig. 1. ↵  ···· 21
       ⋮
   3.2  A CASE OF METHOD 2 ↵     ········ 26
       ⋮
   The result is shown in Fig. 2.↵  ····· 29
       ⋮
                                 ········ 37 ↵ ···RETURN
```

FIG.3B

ELEMENT-2

FIG.1  RESULT OF METHOD 1↵
↵

| ↵ DRUG ↵ | REACTION | ↵ |
|---|---|---|
| ␣␣A␣␣ | ␣␣○ | ↵ |
| ␣␣B␣␣ | ␣␣○ | ↵ |
| ␣␣C␣␣ | ␣␣× | ↵ |
| ␣␣D␣␣ | ␣␣× | ↵ |

FIG.3C

ELEMENT-3

FIG.2  RESULT OF METHOD 2↵
↵

| ↵ DRUG ↵ | REACTION | ↵ |
|---|---|---|
| ␣␣A␣␣ | ␣␣○ | ↵ |
| ␣␣B␣␣ | ␣␣× | ↵ |
| ␣␣C␣␣ | ␣␣○ | ↵ |
| ␣␣D␣␣ | ␣␣× | ↵ |
| ␣␣E␣␣ | ␣␣○ | ↵ |

␣ ······ SPACE

FIG.4

| TYPE | CHARACTERISTICS | ELEMENT-1 | ELEMENT-2 | ELEMENT-3 |
|---|---|---|---|---|
| PHYSICAL CHARACTERISTICS | ELEMENT TYPE<br>NUMBER OF LINES<br>NUMBER OF LETTERS<br>AVERAGE NUMBER OF LETTERS PER LINE<br>VERTICAL SIZE OF FIGURE<br>HORIZONTAL SIZE OF FIGURE<br>NUMBER OF LINE SEGMENTS<br>NUMBER OF VERTICAL LINES<br>NUMBER OF HORIZONTAL LINES<br>AVERAGE VERTICAL LINE SPACING<br>AVERAGE HORIZONTAL LINE SPACING<br>⋯<br>CURVED LINE RATIO<br>BLANK SPACE RATIO(%)<br>⋯ | ARTICLE<br>37<br>2617<br>70.7<br>—<br>—<br>—<br>—<br>—<br>—<br>—<br>⋯<br>0<br>—<br>⋯ | FIGURE<br>9<br>61<br>6.8<br>7<br>10<br>9<br>3<br>6<br>80<br>28.0<br>⋯<br>0<br>38<br>⋯ | TABLE<br>10<br>69<br>6.9<br>8<br>10<br>10<br>3<br>7<br>80<br>26.7<br>⋯<br>0<br>41<br>⋯ |
| STRUCTURAL CHARACTERISTICS | POSITION OF TITLE (LINE NUMBER)<br>HEADER CODE<br>NUMERAL CODE<br>GENERAL LABEL<br>⋯<br>NUMBER OF SECTIONS (ITEMS)<br>AVERAGE NUMBER OF PARAGRAPHS/SECTION<br>AVERAGE NUMBER OF LETTERS/SECTION<br>⋯<br>BLOCK DIAGRAM<br>FRAMEWORK SIZE (LINE X WIDTH)<br>⋯ | 1<br>—<br>—<br>—<br>⋯<br>4<br>1<br>1<br>⋯<br>NONE<br>NONE<br>⋯ | 1<br>1122<br>1<br>—<br>⋯<br>4<br>0<br>9<br>⋯<br>NONE<br>5 X 2<br>⋯ | 1<br>1122<br>2<br>—<br>⋯<br>5<br>0<br>9<br>⋯<br>NONE<br>6 X 2<br>⋯ |
| DENOTATIVE CHARACTERISTICS | KEYWORD IN THE TITLE<br>⋯ | 1102<br>⋯ | 1532<br>⋯ | 1532<br>⋯ |

```
[RULE1]

CONDITION 1. COMPRISING GRAPHIC HEADER,NUMERALS,PHRASE
              IN THIS ORDER

[RESULT]    GRAPHIC LABEL

[RULE2]

CONDITION 2. COMPRISING GENERAL LABEL,NUMERALS
              GRAPHIC HEADER,PHRASE IN THIS ORDER

[RESULT]    GRAPHIC LABEL
```

FIG.6

| CATEGORY | | KEY WORD | | |
|---|---|---|---|---|
| TECHNICAL TITLE | 1101 | PERSPECTIVE | 1102 | CONSIDERATION |
| BUSINESS TITLE | 1111 | NOTICE | 1112 | ANNOUNCEMENT |
| GRAPHIC LABEL | 1121 | FIGURE | 1122 | TABLE |
| GENERAL LABEL | 1131 | TABLE | | |
| CONTRASTIVE WORDS | 1531 | CAUSE | 1532 | RESULT ----- |

FIG.7

```
CONDITION a1   DIFFERENCE IN NUMBER OF LINES WITHIN ±3
CONDITION a2   DIFFERENCE IN AVERAGE NUMBER OF LETTERS PER LINE WITHIN ±3
CONDITION a3   AVERAGE NUMBER OF LETTERS PER LINE ≤ 20 IN BOTH
CONDITION a4   SAME ELEMENT TYPES
CONDITION a5   DIFFERENCE IN NUMBER OF VERTICAL LINES WITHIN ±2
CONDITION a6   DIFFERENCE IN NUMBER OF HORIZONTAL LINES WITHIN ±2
CONDITION a7   DIFFERENCE IN NUMBER OF LINES WITHIN ±1
CONDITION a8   DIFFERENCE IN AVERAGE NUMBER OF LETTERS PER LINE WITHIN ±1
CONDITION a9   DIFFERENCE IN AVERAGE NUMBER OF LETTERS PER LINE WITHIN ±6
CONDITION a10  AVERAGE NUMBER OF LETTERS PER LINES < 40 IN BOTH
CONDITION a11  DIFFERENCE IN AVERAGE VERTICAL LINE SPACING WITHIN ±5
CONDITION a12  DIFFERENCE IN AVERAGE HORIZONTAL LINE SPACING WITHIN ±4
---------------------------------------------------------
RULE A1   a1 ∧ a2 ∧ a3 ∧ a4 ∧ a5 ∧ a6        ──── IDENTICAL
RULE A2   a3 ∧ a4 ∧ a4 ∧ a7 ∧ a8             ──── IDENTICAL
RULE A3   a1 ∧ a3 ∧ a4 ∧ a9 ∧ a10            ──── SIMILAR
RULE A4   a3 ∧ a4 ∧ a4 ∧ a5 ∧ a6 ∧ a11 ∧ a12 ──── IDENTICAL
RULE A5   a4 ∧ a10 ∧ a11 ∧ a12               ──── SIMILAR
```

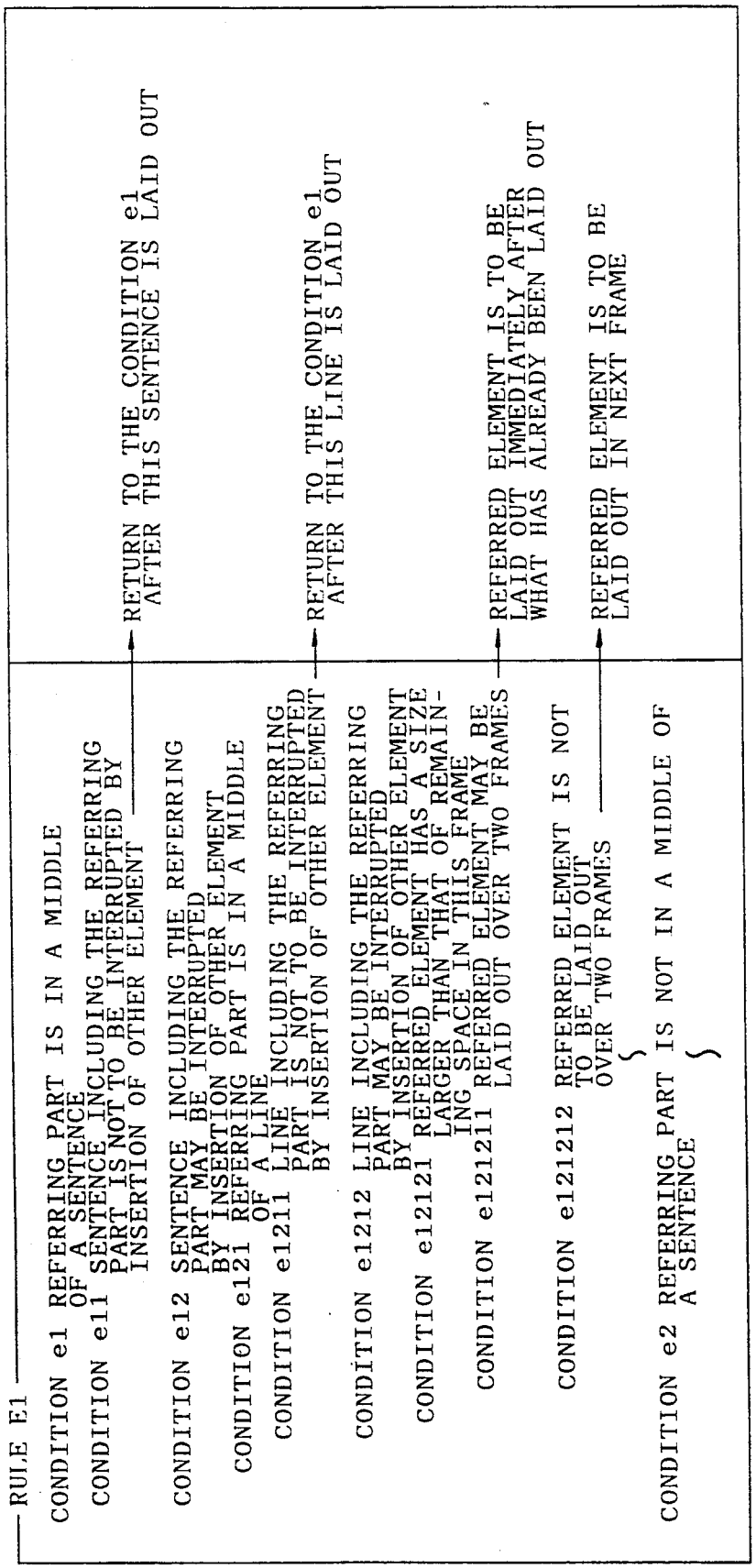

FIG.12

```
RULE E1
CONDITION e1  REFERRING PART IS IN A MIDDLE
              OF A SENTENCE
CONDITION e11 SENTENCE INCLUDING THE REFERRING
              PART IS NOT TO BE INTERRUPTED BY      ──► RETURN TO THE CONDITION e1
              INSERTION OF OTHER ELEMENT                 AFTER THIS SENTENCE IS LAID OUT

CONDITION e12 SENTENCE INCLUDING THE REFERRING
              PART MAY BE INTERRUPTED
              BY INSERTION OF OTHER ELEMENT
  CONDITION e121 REFERRING PART IS IN A MIDDLE
                 OF A LINE
    CONDITION e1211 LINE INCLUDING THE REFERRING
                    PART IS NOT TO BE INTERRUPTED   ──► RETURN TO THE CONDITION e1
                    BY INSERTION OF OTHER ELEMENT        AFTER THIS LINE IS LAID OUT

CONDITION e1212 LINE INCLUDING THE REFERRING
                    PART MAY BE INTERRUPTED
                    BY INSERTION OF OTHER ELEMENT
      CONDITION e12121 REFERRED ELEMENT HAS A SIZE
                       LARGER THAN THAT OF REMAIN-
                       ING SPACE IN THIS FRAME
        CONDITION e121211 REFERRED ELEMENT MAY BE   ──► REFERRED ELEMENT IS TO BE
                          LAID OUT OVER TWO FRAMES       LAID OUT IMMEDIATELY AFTER
                                                         WHAT HAS ALREADY BEEN LAID OUT
        CONDITION e121212 REFERRED ELEMENT IS NOT   ──► REFERRED ELEMENT IS TO BE
                          TO BE LAID OUT                 LAID OUT IN NEXT FRAME
                          OVER TWO FRAMES

CONDITION e2  REFERRING PART IS NOT IN A MIDDLE OF
              A SENTENCE
```

FIG.13

RULE E5

CONDITION f1 RESPECTIVE REFERRING PARTS OF THE PREVIOUSLY REFERRED ELEMENT AND THE SUBSEQUENTLY REFERRED ELEMENT APPEAR IN THE SAME FRAME

CONDITION f11 COMBINED SIZE IN THE X-DIRECTION OF THE PREVIOUSLY REFERRED ELEMENT AND THE SUBSEQUENTLY REFERRED ELEMENT IS LESS THAN THAT OF ONE FRAME → THE PREVIOUSLY REFERRED ELEMENT AND THE SUBSEQUENTLY REFERRED ELEMENT ARE TO BE LAID OUT SIDE BY SIDE

CONDITION f12 COMBIND SIZE IN THE X-DIRECTION OF THE PREVIOUSLY REFERRED ELEMENT AND THE SUBSEQUENTLY REFERRED ELEMENT IS NOT LESS THAN THAT OF ONE FRAME

CONDITION f121 SIZE OF REMAINING SPACE IN THIS FRAME IS LESS THAN THAT OF THE SUBSEQUENTLY REFERRED ELEMENT

CONDITION f1211 SIZE OF SPACE BELOW THE PREVIOUSLY REFERRED ELEMENT IS NOT LESS THAN THAT OF THE SUBSEQUENTLY REFERRED ELEMENT → THE SUBSEQUENTLY REFERRED ELEMENT IS TO BE LAID OUT IMMEDIATELY BELOW THE PREVIOUSLY REFERRED ELEMENT

CONDITION f1212 SIZE OF SPACE BELOW THE PREVIOUSLY REFERRED ELEMENT IS LESS THAN THAT OF THE SUBSEQUENTLY REFERRED ELEMENT

CONDITION f12121 NEXT FRAME IS ON THE SAME PAGE, AND HAS A SIZE GREATER THAN THAT OF THE PREVIOUSLY REFERRED ELEMENT AND THE SUBSEQUENTLY REFERRED ELEMENT COMBINED → THE PREVIOUSLY REFERRED ELEMENT AND THE SUBSEQUENTLY REFERRED ELEMENT ARE TO BE LAID OUT TOGETHER IN NEXT FRAME

CONDITION f12122 NEXT FRAME IS ON THE SAME PAGE, AND HAS A SIZE NOT GREATER THAN THAT OF THE PREVIOUSLY REFERRED ELEMENT AND THE SUBSEQUENTLY REFERRED ELEMENT COMBINED, BUT GREATER THAN THAT OF THE SUBSEQUENTLY REFERRED ELEMENT → THE PREVIOUSLY REFERRED ELEMENT IS TO BE LAID OUT AT ONE END OF THIS FRAME, THE SUBSEQUENTLY REFERRED ELEMENT IS TO BE LAID OUT AT ONE END OF NEXT FRAME, SUCH THAT THEY APPEAR CLOSE TO EACH OTHER

CONDITION f122 SIZE OF REMAINING SPACE IN THIS FRAME IS NOT LESS THAN THAT OF THE SUBSEQUENTLY REFERRED ELEMENT → THE SUBSEQUENTLY REFERRED ELEMENT IS TO BE LAID OUT IMMEDIATELY BELOW THE CORRESPONDING REFERRING PART

FIG. 16A

ELEMENT-4

TABLE 1 RESULT A

| DRUG | REACTION |
|---|---|
| 1 | ○ |
| 2 | ○ |
| 3 | × |

FIG. 16B

ELEMENT-5

TABLE 2 RESULT B

| DRUG | REACTION |
|---|---|
| 1 | ○ |
| 2 | × |
| 3 | × |

| CATEGORY NO. | CATEGORY | KEY WORD | | | |
|---|---|---|---|---|---|
| 1 | TECHNICAL TITLE | 1101 PERSPECTIVE | 1102 CONSIDERATION | ---- | |
| 2 | BUSINESS TITLE | 1111 NOTICE | 1112 ANNOUNCEMENT | ---- | |
| 3 | GRAPHIC HEADER | 1121 FIGURE | 1122 TABLE | | |
| 4 | GENERAL LABEL | 1131 TABLE | 1132 ---- | | |
| ~ | ~ | | | | |
| 61 | CONTRASTIVE WORDS | 1531 CAUSE | 1532 RESULT ---- | | |
| 62 | CONTRASTIVE WORDS | 1541 ADVANTAGE | 1542 DISADVANTAGE | ---- | |
| ~ | ~ | | | | |
| 76 | ATTRIBUTION | 1691 ATTRIBUTE | 1692 FEATURE | 1693 CHARACTERISTIC | ---- |
| ~ | ~ | | | | |
| 87 | EXPLANATION | 1801 EXPLANATION | 1802 CONFIGURATION | 1803 SPECIFICATION | ---- |
| 88 | EXPRESSION | 1821 INDICATED | 1822 SHOWN | 1823 DISPLAYED | ---- |
| ~ | ~ | | | | |

| NO. | RULE | MEANING FUNCTION |
|---|---|---|
| ⁓ | ⁓ | ⁓ |
| 205 | [WORD OF CATEGORY NO.87]+$\begin{Bmatrix} OF \\ ON \end{Bmatrix}$+[A] | Explanation(A) |
| 206 | [WORD OF CATEGORY NO.88]+$\begin{Bmatrix} BY \\ OF \end{Bmatrix}$+[A]<br>[WORD OF CATEGORY NO.76]+ | Attribute(A) |
| ⁓ | ⁓ | ⁓ |

CONFIGURATION OF A.I.T.

TABLE.1
SPECIFICATION OF A.I.T.

METHOD AND APPARATUS FOR EDITING DOCUMENTS

This application is a continuation of application Ser. No. 07/670,481, filed Mar. 15, 1991, now abandoned which is a continuation of application Ser. No. 07/299,337, filed Jan. 23, 1989, now abandoned.

BACKGROUND OF THE INVENTION

1. Field of the Invention

The present invention relates to a method and an apparatus for editing documents which revise a document such that its elements are properly put together and arranged.

2. Description of the Background Art

Lately, a number of propositions have been made for a pattern generator utilizing a computer capable of generating patterns from a variety of data such as graphic data, image data, and color data, for the purpose of preparing such things as presentation documents, public announcements, or brochures. Along with such pattern generators, there are various types of multi-functional editors for editing data obtained from any one of a plurality of source media being developed.

Yet, such a multi-functional editor becomes progressively complicated in order to accommodate diverse commands and functions as the number of types of data it deals with increases. As a result, mastering skillful maneuvers of such a multi-functional editor tends to require an enormous amount of training to be able to take full advantage of its superior faculty, and even with such skills it is often necessary to spend a great deal of effort and time in dealing with a complicated situation.

On the other hand, there are some types of document editing systems which edit a given document in a prescribed manner automatically by analyzing logical and referential structures of the document, such as the one reported by I. Iwai, M. Doi, and M. Fukui in "On the Document Structure Generating Function of the intelligent Document Editing System" appearing in 'The Proceedings of the 34th General Conference of the Japanese Society of Information Processing', pp. 1309-1310, 1987, and that disclosed in Japanese patent application No. S61-21570(1986) in which corresponding descriptions and drawings are put together automatically on the same page by means of a referential word in the descriptions.

However, such a document editing system so far has not been able to produce a satisfactory result with respect to orderliness because of the lack of coherence and balance among various data from different sources. Consequently, it has conventionally been necessary to perform very complicated editing operations in order to achieve satisfactory results.

SUMMARY OF THE INVENTION

It is therefore an object of the present invention to provide a method and an apparatus for editing documents capable of producing a satisfactorily well ordered document automatically.

According to one aspect of the present invention there is provided a method for editing a document containing a plurality of elements, comprising the steps of: (a) extracting characteristic quantities which characterize different elements of the document; (b) deriving relationships among the different elements of the document in accordance with the characteristic quantities; (c) determining the layout of the different elements of the document in accordance with the relationships; and (d) processing the document in accordance with the layout.

According to another aspect of the present invention there is provided an apparatus for editing a document containing plurality of elements, comprising: means for extracting characteristic quantities which characterize different elements of the document; means for deriving relationships among the different element of the document in accordance with the characteristic quantities; means for determining the layout of the different elements of the document in accordance with the relationships; and means for processing the document in accordance with the layout.

Other features and advantages of the present invention will become apparent from the following description taken in conjunction with the accompanying drawings.

BRIEF DESCRIPTION OF THE DRAWINGS

FIGS. 2A and 2B comprise a flow chart of the operation of the document editor shown in FIG. 1.

FIGS. 3A-3C are illustrations of elements of an exemplary document to be edited by the document editor shown in FIG. 1.

FIG. 4 is a tabulated illustration of the contents of a characteristics memory of the document editor shown in FIG. 1.

FIG. 6 is an illustration of the contents of a key word dictionary in a characteristics extraction unit of the document editor shown in FIG. 1.

FIG. 7 is an illustration of physical relationship extraction rules in a relationship extraction rule dictionary of the document editor shown in FIG. 1.

FIG. 10 is a tabulated summary of the results of characteristics extraction for the exemplary document shown in FIG. 3.

FIG. 11 is an illustration of the contents of a document editing rule dictionary of the document editor shown in FIG. 1.

FIG. 12 is an illustration of one document editing rule in the document editing rule dictionary.

FIG. 13 is an illustration of another document editing rule in the document editing rule dictionary.

FIGS. 15A-15E are illustrations of a possible layouts of document for different circumstances.

FIG. 16 is an illustration of a one layout of document obtainable by one modification of the operation shown in FIG. 2.

FIG. 18 is an illustration of the contents of the key word dictionary for explaining a certain modification of the operation shown in FIG. 2.

DETAILED DESCRIPTION OF THE PREFERRED EMBODIMENTS

Figures 1, 19, 20A, 20B:
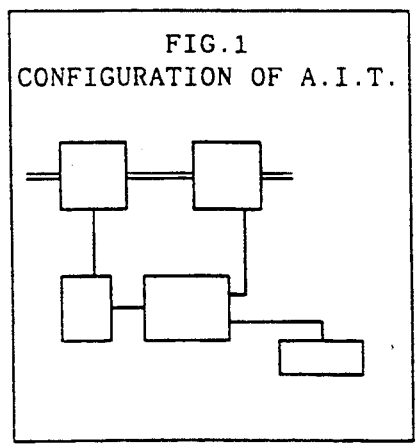
FIG. 1 is a block diagram of one embodiment of a document editor according to the present invention.
FIG. 19 is an illustration of the contents of a meaning extraction dictionary to be utilized in a certain modification of the operation of the editor.
FIGS. 20A & 20B are illustrations of the elements of a document to be edited in a certain modification of the operation of the editor.

Referring now to FIG. 1, there is shown one embodiment of a document editor according to the present invention.

This document editor comprises the following.

A data input unit 10 is provided for input of document data which contain elements such as article data, graphic data, and image data which are classified according to distinct physical, structural, and denotative characteristics of different parts of a document to be edited. This data input unit may take the form of a keyboard, a mouse, a scanner, a disk device, or any combination thereof.

A document data memory 20 stores the document data entered at the data input unit 10.

A characteristics extraction unit 30 extracts characteristic quantities such as physical characteristics, structural characteristics, and denotative characteristics from the document data stored in the document data memory 20. The physical characteristics here are given as numerical data obtained from numbers indicating such quantities as a number of lines, a number of words, and a blank area ratio. The structural characteristics here are given as other numerical data indicating such quantities as header positions, article positions, the number of sections, and positions and sizes of the graphics which are obtainable by morphemic analysis of the document. The denotative characteristics here are given as still other numerical data indicating addresses of key words, extracted by contextual analysis of the document from titles, headers, and articles, in a key word dictionary which stores them collectively.

A characteristics memory 40 stores the characteristic quantities obtained by the characteristics extraction unit 30.

A relationship extraction unit 50 for extracting relationships among different elements of the document data such as referential relationships, physical relationships, structural relationships, and denotative relationships, in accordance with the characteristic quantities stored in the characteristics memory 40, comprises a relationship extraction processor 51 which carries out the extraction of these relationships and a relationship extraction rule dictionary 52 which stores rules to be applied in a process for relationship extraction. The referential relationships here are those relationships between graphics and key words in articles which indicate references to these graphics. The physical and structural relationships here are such relationships as similarities and resemblances, and the denotative relationships here are such relationships as parallels, contrasts, inclusions, and equivalences.

A relationship memory 60 stores the relationships extracted by the relationship extraction unit 50.

A document editing unit 70 for arranging related elements of the document data in a prescribed layout pattern, in accordance with the relationships stored in the relationship memory 60, comprises a document editing processor 71 which carries out editing of the document, and a document editing rule dictionary 72 which stores rules to be applied in the process of document editing.

A document administration unit 80 administers the flows of various data among those components of this document editor mentioned so far.

Lastly, the edited document display unit 90 displays a document given by the document data edited by the document editing unit 70. This edited document display unit 90 may take the form of a CRT display, a projector, or a printer.

Referring now to FIG. 2, the operation of this document editor will be explained with subsidiary references to FIGS. 3 to 20.

In the following, an explanation will be given for an exemplary case of editing a document comprising elements shown in FIGS. 3(A), 3(B), and 3(C). An element-1 shown in FIG. 3(A) is article data, whereas element-2 and element-3 shown in FIGS. 3(B) and 3(C), respectively, are graphic data, and there are references made in the article of element-1 to the graphics of element-2 and element-3 at line 21 and line 29, respectively.

At the step 101, document data representing these elements of the document to be edited are entered from the data input unit 10 and are stored in the document data memory 20.

Then, at the step 102, the document data stored in the document data memory 20 are given to the characteristics extraction unit 30 by the document administration unit 80, and various physical characteristics are extracted from the document data. Namely, as shown in FIG. 4, various characteristics such as element type, number of lines, number of letters, average number of letters, etc. are extracted from each element of the document data. The extracted physical characteristics are stored in the characteristics memory 40.

Figure 5A:
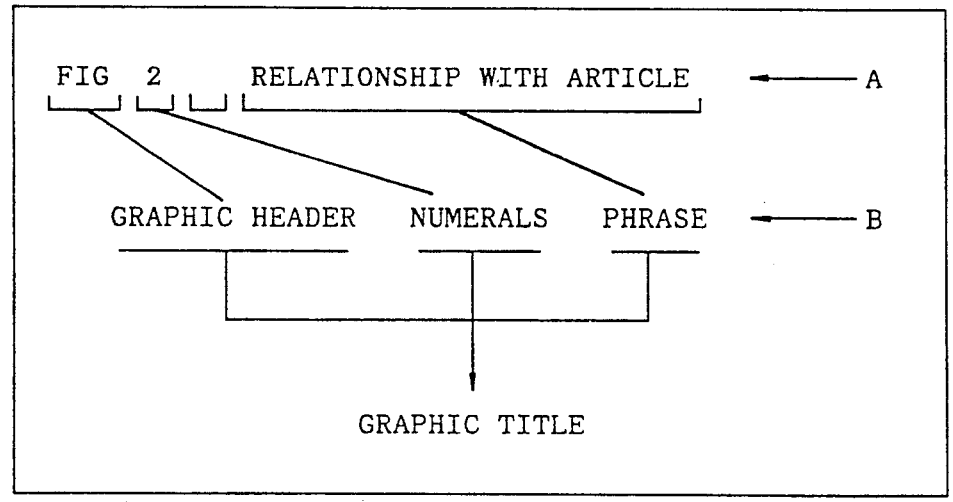
FIGS. 5A-5B are illustrations for explaining one type of characteristics extraction by the document editor shown in FIG. 1.
Figure 5B:

Next, at the step 103, the characteristics extraction unit 30 extracts various structural characteristics such as position of title (line number), header code, numeral code, etc. from each of the elements of the document data, as shown in FIG. 4. For example, to extract the position of the title, a sentence shown in line A in FIG. 5(A) is broken up into portions such as graphic header, numerals, and phrase which belong to different categories, by means of pattern matching with a graphic header dictionary not shown, and then the rules for graphic titles shown in FIG. 5(B) are applied. Since the sentence comprises a graphic header, numerals, and phrase in that order, rule 1 in FIG. 5(B) applies and the sentence is recognized as a graphic title. Then the position of this sentence is determined which can be identified as the position of the title. The extracted structural characteristics are also stored in the characteristics memory 40.

Next, at the step 104, the characteristics extraction unit 30 extracts various denotative characteristics such as a key word in the title, as shown in FIG. 4. The key word in the title, for example, is extracted by searching words registered in a key word dictionary shown in FIG. 6, and will be identified by a code of four digits accompanying each word. The extracted denotative characteristics are also stored in the characteristics memory 40.

The step 105 ensures that the characteristics extractions at the steps 102 to 104 are carried out for all the elements of the document data.

Next, at the step 106, the document data stored in the document data memory 20 are given to the relationship extraction unit 50 by the document administration unit 80, and referential relationships between the articles of element-1 and the graphics of element-2 and element-3 are extracted. This is done by searching the words indicative of the referential relationship such as 'Table 1' in 21 and 'Table 2' in the line 29.

Then, at the step 107, the physical characteristics stored in the characteristics memory 40 are given to the relationship extraction unit 50 by the document administration unit 80, and physical relationships among the elements of the document data are extracted. This is done by utilizing physical relationship extraction rules stored in the relationship extraction rule dictionary 52 which are shown in FIG. 7. Namely, the relationship extraction processor 51 examines physical characteristics of each different pair formed by two of the elements to determine which of the conditions a1, a2, a3, etc. in the physical relationship extraction rules shown in FIG. 7 are satisfied by this pair, and determines appropriate physical relationships such as identical and similar according to the rules A1, A2, A3, etc. in the physical relationship extraction rules. In FIG. 7, the symbol $\Lambda$ stands for 'and' so that rule A1 means that when all the conditions a1,a2,a3,a4,a5 and a6 are satisfied together, the physical relationship is 'identical'. The extracted physical relationships are stored in the relationship memory 60.

Figure 8:
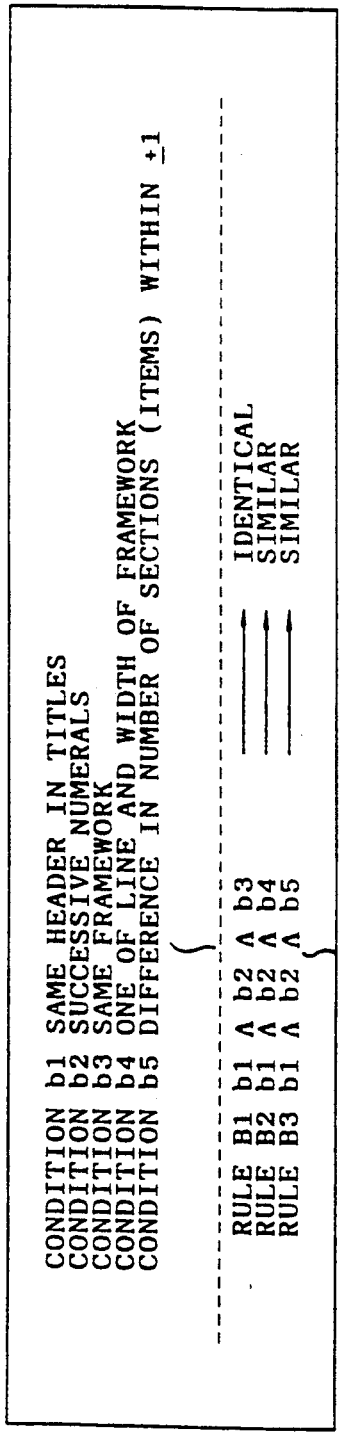
FIG. 8 is an illustration of structural relationship extraction rules in a relationship extraction rule dictionary of the document editor shown in FIG. 1.

Next, at the step 108, the structural characteristics stored in the characteristics memory 40 are given to the relationship extraction unit 50 by the document administration unit 80, and structural relationships among the elements of the document data are extracted. This is done by utilizing structural relationship extraction rules stored in the relationship extraction rule dictionary 52 which are shown in FIG. 8. Namely, the relationship extraction processor 51 examines structural characteristics of each different pair formed by two of the elements to determine which of the conditions b1, b2, b3, etc. in the structural relationship extraction rules shown in FIG. 8 are satisfied by this pair, and determines appropriate structural relationships such as identical and similar according to the rules B1, B2, B3, etc. in the structural relationship extraction rules. Here, the symbol $\Lambda$ again stands for 'and' so that rule B1 means that when all the conditions b1, b2, and b3 are satisfied together, the structural relationship is 'identical'. The extracted structural relationships are also stored in the relationship memory 60.

Figure 9:
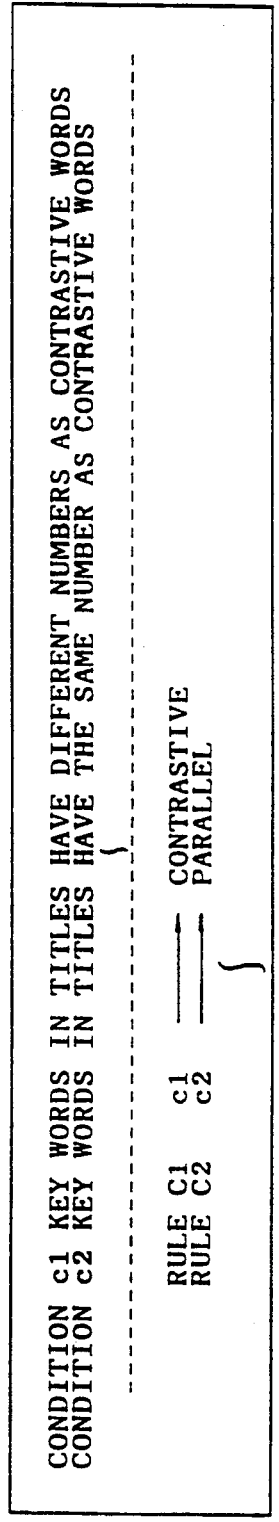
FIG. 9 is an illustration of denotative relationship extraction rules in a relationship extraction rule dictionary of the document editor shown in FIG. 1.

Next, at the step 109, the denotative characteristics stored in the characteristics memory 40 are given to the relationship extraction unit 50 by the document administration unit 80, and denotative relationships among the elements of the document data are extracted. This is done by utilizing denotative relationship extraction rules stored in the relationship extraction rule dictionary 52 which are shown in FIG. 9. Namely, the relationship extraction processor 51 examines denotative characteristics of each different pair formed by two of the elements to determine which of the conditions c1, c2, etc. in the denotative relationship extraction rules shown in FIG. 9 are satisfied by this pair, and determines appropriate denotative relationships such as contrastive and parallel according to the rules C1, C2, etc. in the denotative relationship extraction rules. The extracted denotative relationships are also stored in the relationship memory 60.

The result of the relationship extractions performed for element-1, element-2, and element-3 of FIGS. 3(A), 3(B), and 3(C) is shown in FIG. 10. As shown, there are referential relationships between element-1 and element-2, and between element-1 and element-3. Also, the graphics of element-2 and element-3 have a physical relationship 'identical', a structural relationship 'similar', and a denotative relationship 'parallel' because of rule A1 in FIG. 7, rule B2 in FIG. 8, and rule C2 in FIG. 9, respectively.

At this point, the document data stored in the document data memory 20 and the relationships stored in the relationship memory 60 are given to the document editing unit 70 by the document administration unit 80 in order to carry out the actual editing of the document. This is done as follows.

Figure 2B:
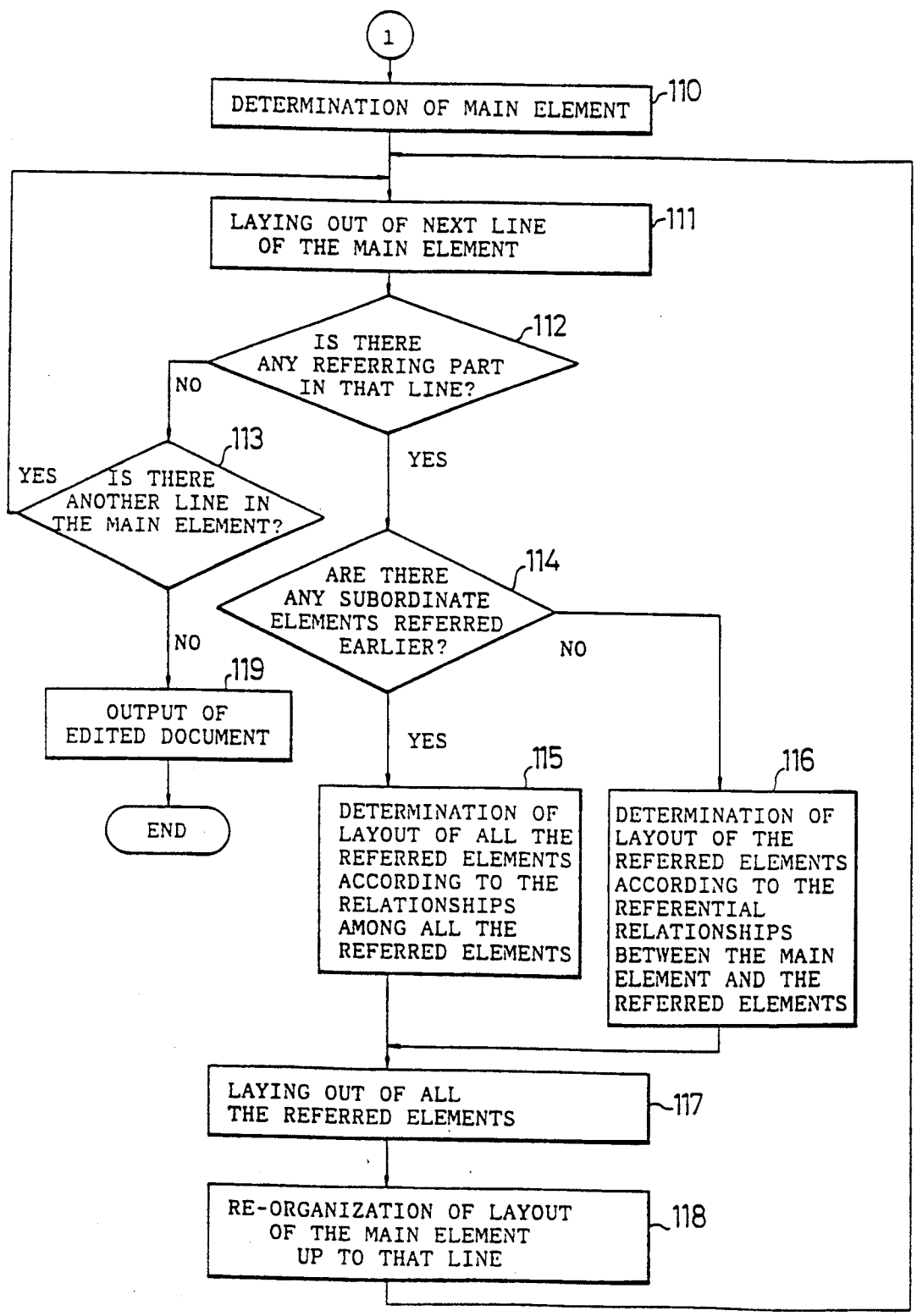

First of all, at the step 110 in FIG. 2b the document editing processor determines a main element which in this example of the document data is element-1, and subordinate elements which are referred to by the main element which in this example are element-2 and element-3, from the referential relationships determined earlier and shown in FIG. 10.

From this point on, document editing rules stored in the document editing rule dictionary 72 which is shown in FIGS. 11, 12, and 13 are utilized by the document editing processor 71. Namely, whenever a reference is made from the main element to the subordinate elements, the document editing processor determines conditions in FIG. 11 which are being satisfied by the elements involved, in accordance with the relationships among the elements determined earlier, and selects an appropriate case from rules D1, D2, D3, etc. and applies one of rules E1, E2, E3, etc. indicated in carrying out the editing of the document. Only those parts of the rules E1 and E5 pertinent to the following explanation are shown in FIGS. 12 and 13. In FIG. 11, the symbol $\Lambda$ stands for 'and' as before, and in addition the symbol v stands for 'or' which prevails over 'and', so that rule D3 means when either one of conditions d31 or d32, and a condition d22 are satisfied together rule E3 is to be applied. Also, in FIGS. 12 and 13, indentation and indices implies the hierarchical structure among the various conditions in an obvious manner.

Now at the step 111, one line of the main element is laid out.

At the step 112 whether there is any part of this line which makes a reference to subordinate elements (such a part will be called a referring part in the following) is determined. When there is no referring part in that line, the step 113 is taken in which whether there is another line in the main element is determined, and the steps from the step 111 on are repeated until the last line of the main element is laid out.

On the other hand, when there is a referring part in that line, the step 114 is taken in which whether there are any subordinate elements referred earlier is determined. When there are such subordinate elements, the step 115 is taken at which the layout of all the subordinate elements referred to so far, including those previously referred to and subsequently laid out, are determined according to the various relationships among these subordinate elements. Here, the previously determined layout of the previously referred to subordinate elements is superseded.

On the other hand, when there is no previously referred subordinate element, the step 116 is taken at which the layout of the presently referred element is determined according to the referential relationships between the main element and the referred element.

This determination of the layout of the referred elements is illustrated in FIGS. 14 and 15 for the example of the document in two different circumstances.

Figure 14A:
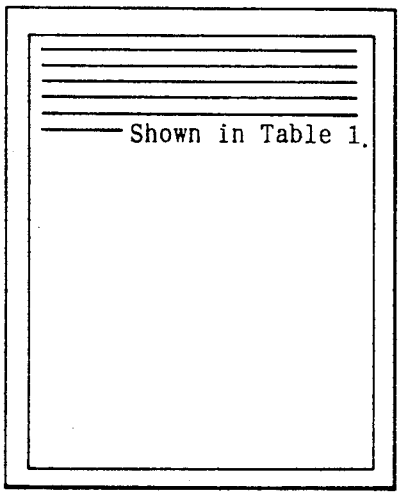
FIGS. 14A-14E are sequential illustrations of a document being edited by the document editor shown in FIG. 1.
Figure 14B:
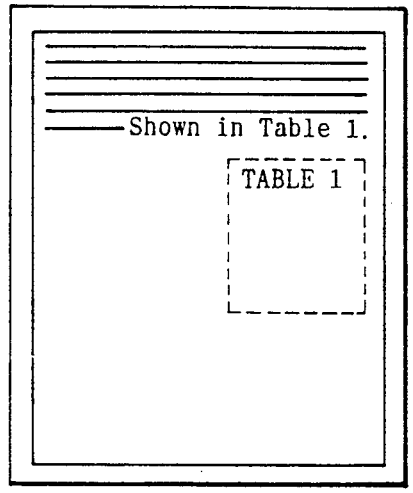
Figure 14C:
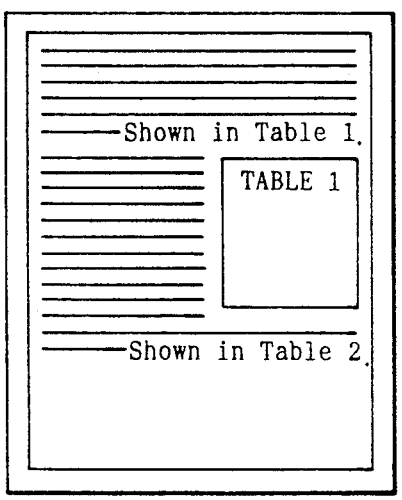
Figure 14D:
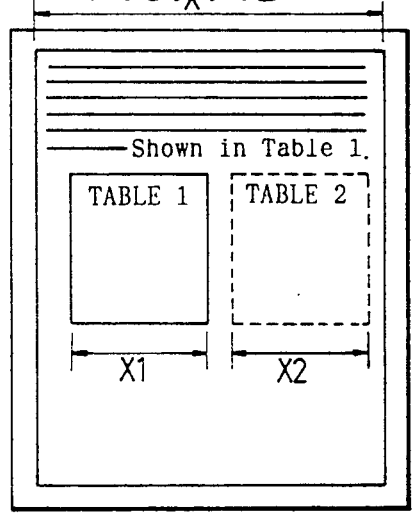
Figure 14E:
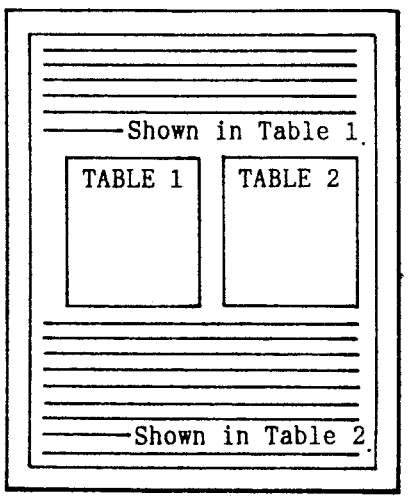

Namely, in the first case, the lines of element-1 are laid out until the key word 'Table 1' appears for the first time, as shown in FIG. 14(A). Since there is no previously referred subordinate element at this point, the condition d11 of FIG. 11 is the only one that is satisfied, and so according to the rule D1 of FIG. 11, rule E1 shown in FIG. 12 applies. Consequently, element-2 which contains Table 1 is laid out immediately below the key word 'Table 1', as shown in FIG. 14(B). Then the layout of the lines of element-1 is resumed until the next referring part appears which in this case is the key word 'Table 2', as shown in FIG. 14(C). Now, since element-1 has already been referred to and laid out at this point, rule D5 of FIG. 11 is relevant and accordingly rule E5 shown in FIG. 13 applies. Here, the sum of the sizes x1 and x2 of the Table 1 and the Table 2, respectively, in the x-direction is less than the size X of the frame in this first case, so that the condition f11 of FIG. 13 is satisfied, and consequently Table 1 and Table 2 are laid out side by side, as shown in FIG. 14(D). Then, the layout of element-1 up to this point is reorganized so that the determined layout of the subordinate elements is incorporated, as shown in FIG. 14(E).

Figure 15A:
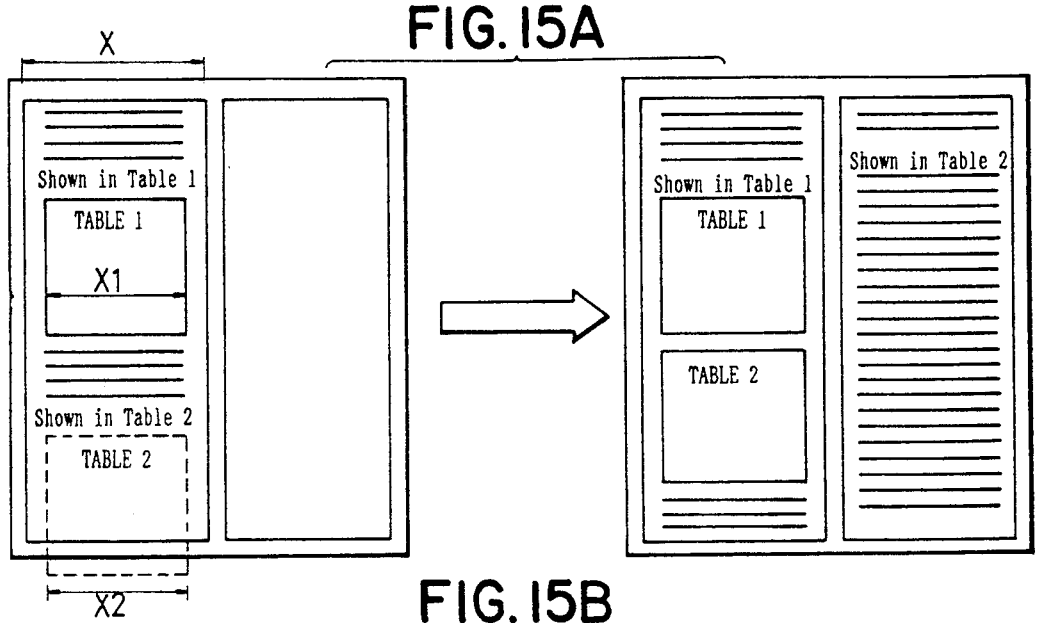
Figure 15B:
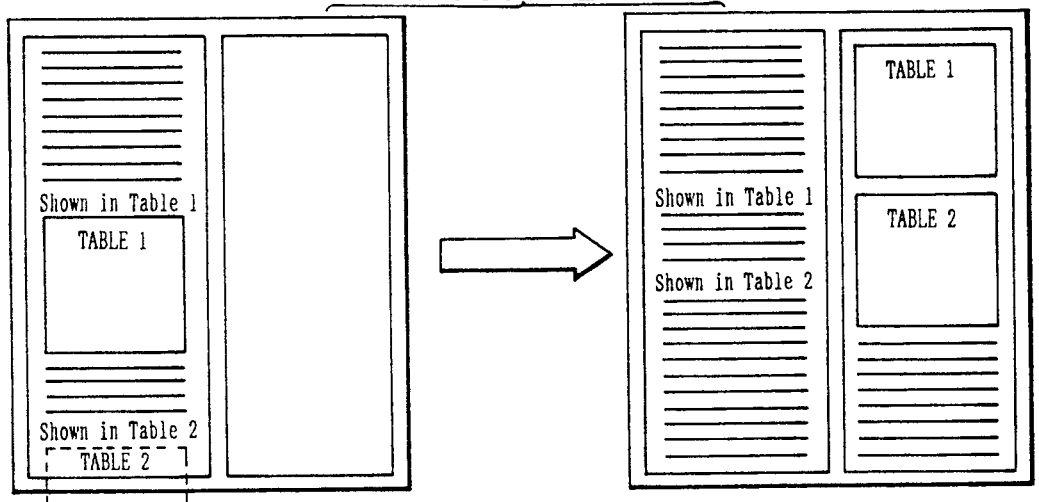
Figure 15C:
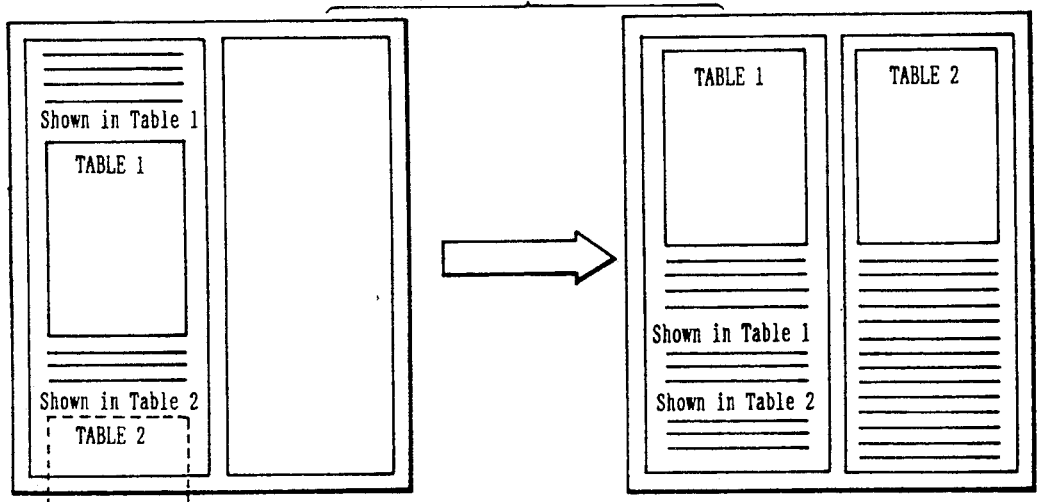

On the other hand, in the second case, the sum of the sizes x1 and x2 of Table 1 and Table 2, respectively, in the x-direction is greater than the size X of the frame, although either of the size x1 and the size x2 individually is less than the size X. Thus, this case proceeds similarly to the previous one until the second referring part with the key word 'Table 2' appears. As in the previous case, since element-1 has already been referred to and laid out at this point, rule D5 of FIG. 11 is relevant and accordingly rule E5 shown in FIG. 13 applies. Here, however, the condition f12 is satisfied. Therefore when the condition f1211 is further satisfied, Table 2 is laid out immediately below Table 1 as shown in FIG. 15(A); when the condition f12121 is further satisfied, the Table 1 and the Table 2 are laid out together in the next frame as shown in FIG. 15(B); and when the condition f12122 is further satisfied, Table 1 is laid out at the top of that frame while Table 2 is laid out at the top of the next frame as shown in FIG. 15(C). Similar layout is obtainable for other cases for which rule D3 of FIG. 11 applies such as those which are physically not identical, but structurally similar, by preparing similar rules appropriately.

After the layout has been determined either at the step 115 or at the step 116, then all the referred elements are laid out according to the determined layout at the step 117, and the layout of the document up to that line including all the subordinate elements referred so far is re-organized according to the newly determined layout of the subordinate elements at the step 118, and the process returns to the step 111.

After all the line of the main element as well as all the subordinate elements have been laid out in the manner described above, the resulting edited document is shown by the edited document display unit 90 at the step 119, and the process terminates.

As explained, according to this embodiment it is possible to edit a document to automatically obtain a satisfactory well ordered layout.

It is to be noted that various characteristics and relationships utilized in this embodiment may be suitably altered both in number as well as in content under different circumstances without losing the distinct advantages of the present invention. In particular, there are several effective modifications possible to this embodiment.

First of all, the detection of the referring part by searching of the key words at each line followed by the determination of the layout can be replaced by the determination of the layout at each location of the referring part which is recorded from the search of the key words over the entire document carried out in advance.

Secondly, for two subordinate elements which have different sizes but are structurally identical and denotatively related as parallel, such as an element-4 and an element-5 shown in FIG. 16, rule D4 of FIG. 11 is applicable. Thus, by incorporating rules to select appropriate magnifications for each element, a well balanced layout such the one shown in FIG. 16 is obtainable. Here, additional care to regulate the magnification for letters can improve the uniformity of the layout. Also, unsatisfactory magnifying can be prevented by determining physical similarity in terms of the number of letters.

Figure 17:
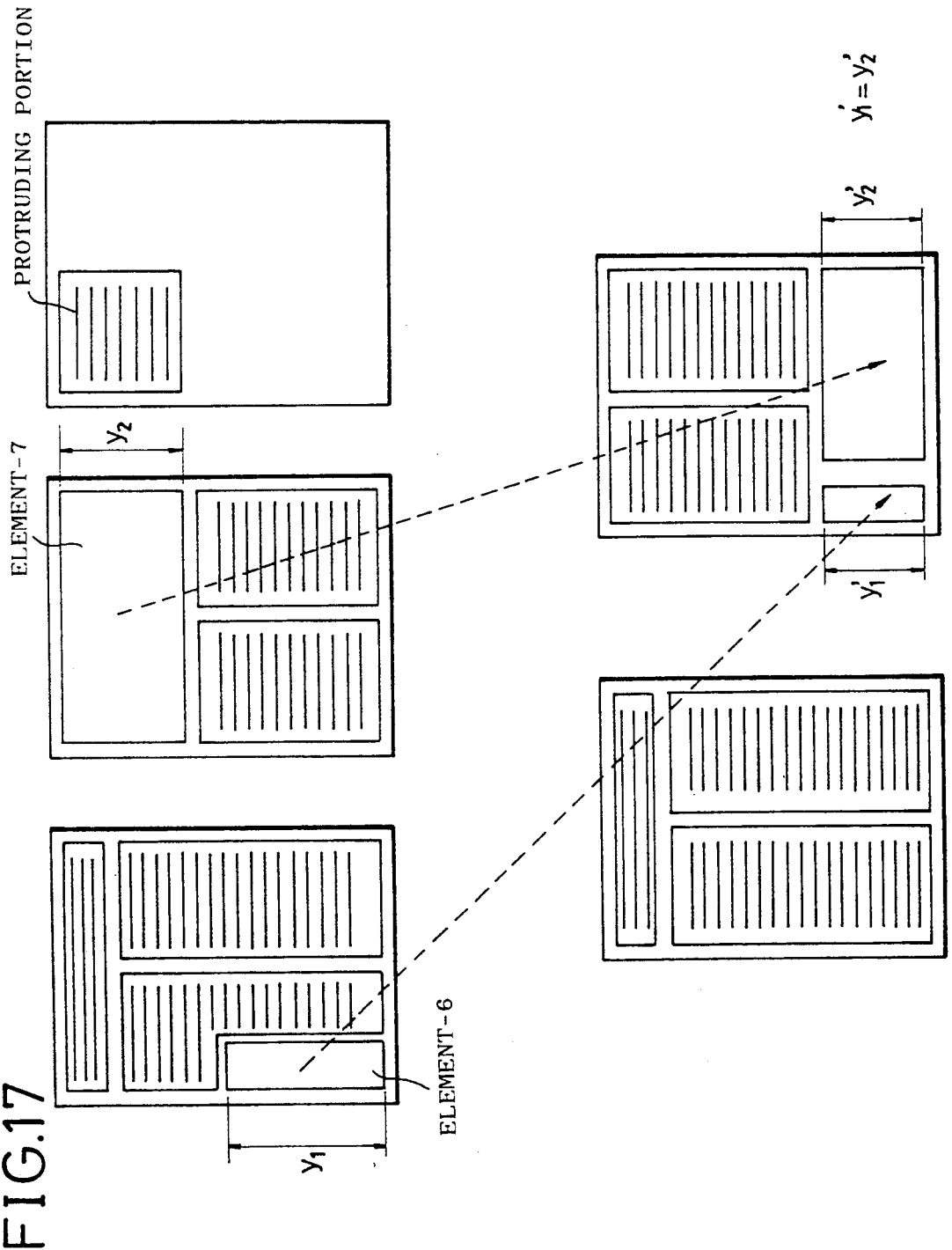
FIG. 17 is an illustration of a another layout of document obtainable by another modification of the operation shown in FIG. 2.

Thirdly, in a case in which a maximum number of pages are dictated, such as conference proceedings, the incorporation of the rules to select appropriate magnifications for each element as in the above can be utilized for adjusting the sizes of the subordinate elements so that the document can be fit into the available space. For example, when an element-6 and an element-7 shown in FIG. 17 are structurally similar and denotatively related as parallel, rule D4 of FIG. 11 is applicable. Thus, by incorporating rules to determine appropriate magnifications in the x-direction as well as in the y-direction for each element, such that the size y1 of element-6 in the y-direction and size y2 of the element-7 in the y-direction are transformed into the sizes y1' and y2' which are equal to each other, the document can be fit into the available space while maintaining the balance of the layout, as shown in FIG. 17.

Lastly, the denotative relationships may be derived not only from the key words, but also from syntactical analysis. Namely, when the key word dictionary in the relationship extraction rule dictionary 52 is as shown in FIG. 18 where each category is associated with a distinct category number, the relationship extraction rule dictionary 52 may be installed as a meaning extraction dictionary as shown in FIG. 19 which determines a meaning function indicating the meaning of an element by a kind of syntactical analysis consisting of matching between the category number of the extracted key word and stored grammatical rules given in terms of prepositions and the like. In this meaning extraction dictionary of FIG. 19, a variable represented by a symbol [A] is to be filled by a phrase from the element. Thus, for example, with respect to an element shown in FIG. 20(A), a key word to be extracted is 'configuration' which belongs to the category number 87 according to the key word dictionary of FIG. 18, and a phrase to fill in a variable is 'A.I.T.' so that rule 205 in the meaning extraction dictionary of FIG. 19 is applied with A being 'A.I.T.' to obtain an appropriate meaning function 'Explanation(A.I.T.)'. Similarly, a meaning function for another element shown in FIG. 20 can be determined also as 'Explanation(A.I.T.)', so that the fact that these two elements have similar meanings can be derived and appropriate care can be taken in determining their layout such as 'to be arranged side by side' or 'to be arranged close by'.

Besides these, many modifications and variations of this embodiment may be made without departing from the novel and advantageous features of the present invention. Accordingly, all such modifications and variations are intended to be included within the scope of the appended claims.

What is claimed is:

1. A method for editing a document containing sentence elements and figure elements, comprising the steps of:
   (a) extracting characteristic quantities which characterize each of said figure elements of said document;
   (b) deriving physical relationships among said figure elements of said document indicative of compatibility of each one of said figure elements with the other ones of said figure elements in view of an overall balance of a layout of said document by using said characteristic quantities extracted at the step (a) and deriving referential relationships between said sentence elements and said figure elements of said document indicative of positions of words in said sentence elements which make references to said figure elements;
   (c) determining layout position and size of each of said figure elements of said document with respect to already laid out parts of said sentence elements and said figure elements in accordance with said physical relationships and said referential relationships derived at the step (b); and
   (d) processing said document in accordance with said layout position and size determined at the step (c).

2. The method of claim 1, wherein said physical relationships among said figure elements include a relationship of being identical to one another in physical configuration and a relationship of being similar to one another in physical configuration.

3. The method of claim 1, wherein the characteristic quantities include physical characteristics.

4. The method of claim 3, wherein said physical characteristics are given in terms of numerical quantities measured from physical configurations of said figure elements.

5. An apparatus for editing a document containing sentence elements and figure elements, comprising:
   means for extracting characteristic quantities which characterize each of said figure elements of said document;
   means for deriving physical relationships among said figure elements of said document indicative of compatibility of each one of said figure elements with the other ones of said figure elements in view of an overall balance of a layout of said document by using said characteristic quantities extracted by said means for extracting and deriving referential relationships between said sentence elements and said figure elements of said document indicative of positions of words in said sentence elements which make references to said figure elements;
   means for determining layout position and size of each of said figure elements of said document with respect to already laid out parts of said sentence elements and said figure elements in accordance with said physical relationships and said referential relationships derived by said means for deriving; and
   means for processing said document in accordance with said layout position and size determined by said means for determining.

6. The apparatus of claim 5, wherein said physical relationships among said figure elements include a relationship of being identical to one another in physical configuration and a relationship of being similar to one another in physical configuration.

7. The apparaties of claim 5, wherein the characteristic qualities includes physical characteristics.

8. The apparatus of claim 7, wherein said physical characteristics are given in terms of numerical quantities measured from physical configurations of said figure elements.

9. A method for editing a document containing sentence elements and figure elements, comprising the steps of:
   (a) extracting characteristic quantities which characterize each of said figure elements of said document;
   (b) deriving structural relationships among said figure elements of said document indicative of compatibility of each one of said figure elements with the other ones of said figure elements in view of an overall balance of a layout of said document by using said characteristic quantities extracted at the step (a) and deriving referential relationships between said sentence elements and said figure elements of said document indicative of positions of words in said sentence elements which make reference to said figure elements;
   (c) determining layout position and size of each of said figure elements of said document with respect to already laid out parts of said sentence elements and said figure elements in accordance with said structural relationships and said referential relationships derived at the step (b); and
   (d) processing said document in accordance with said layout position and size determined at the step (c).

10. The method of claim 9, wherein said structural relationships among said figure elements include a relationship of being identical to one another and a relationship of being similar to one another.

11. The method of claim 9, wherein the characteristic quantities include structural characteristics.

12. The method of claim 11, wherein said structural characteristics are given in terms of numerical quantities determined from structures of said figure elements obtained by analyzing the structures of said figure elements.

13. An apparatus for editing a document containing sentence elements and figure elements, comprising:
   means for extracting characteristic quantities which characterize each of said figure elements of said document;
   means for deriving structural relationships among said figure elements of said document indicative of compatibility of each one of said figure elements with the other ones of said figure elements in view of an overall balance of a layout of said document by using said characteristic quantities extracted by said means for extracting and deriving referential relationships between said sentence elements and said figure elements of said document indicative of positions of words in said sentence elements which make reference to said figure elements;

means for determining layout position and size of each of said figure elements of said document with respect to already laid out parts of said sentence elements and said figure elements in accordance with said structural and said referential relationships derived by said means for deriving; and means for processing said document in accordance with said layout position and size determined by said means for determining.

14. The apparatus of claim 13, wherein said structural relationships among said figure elements include a relationship of being identical to one another and a relationship of being similar to one another.

15. The apparatus of claim 13, wherein the characteristic quantities include structural characteristics.

16. The apparatus of claim 15, wherein said structural characteristics are given in terms of numerical quantities measured from structures of said figure elements obtained by analyzing the structures of contents of said figure elements.

17. A method for editing a document containing sentence elements and figure elements, comprising the steps of:

(a) extracting characteristic quantities which characterize each of said figure elements of said document;

(b) deriving denotative relationships among said figure elements of said document indicative of compatibility of each one of said figure elements with the other ones of said figure elements in view of an overall balance of a layout of said document by using said characteristic quantities extracted at the step (a) and deriving referential relationships between said sentence elements and said figure elements of said document indicative of positions of words in said sentence elements which make reference to said figure elements;

(c) determining layout position and size of each of said figure elements of said document with respect to already laid out parts of said sentence elements and said figure elements in accordance with said denotative relationships and said referential relationships derived at the step (b); and (d) processing said document in accordance with said layout position and size determined at the step (c).

18. The method of claim 17, wherein said denotative relationship includes a relationship of being parallel to one another in meanings of contents of said figure elements, a relationship of being in contrast to one another in meanings of contents of said figure elements, a relationship of being inclusive of one another in meanings of contents of said figure elements, and a relationship of being equivalent to one another in meanings of contents of said figure elements.

19. The method of claim 17, wherein the characteristic quantities include denotative characteristics.

20. The method of claim 19, wherein said denotative characteristics are obtained by analyzing meanings of words contained in said figure elements.

21. An apparatus for editing a document containing sentence elements and figure elements, comprising:

means for extracting characteristic quantities which characterize each of said figure elements of said document;

means for deriving denotative relationships among said figure elements of said document indicative of compatibility of each one of said figure elements with the other ones of said figure elements in view of an overall balance of a layout of said document by using said characteristic quantities extracted by said means for extracting and deriving referential relationships between said sentence elements and said figure elements of said document indicative of positions of words in said sentence elements which make references to said figure elements;

means for determining layout position and size of each of said figure elements of said document with respect to already laid out parts of said sentence elements and said figure elements in accordance with said denotative and referential relationships derived by said means for deriving; and means for processing said document in accordance with said layout position and size determined by said means for determining.

22. The apparatus of claim 21, wherein said denotative relationships include a relationship of being parallel to one another in meanings of contents of said figure elements, a relationship of being in contrast to one another in meanings of contents of said figure elements, a relationship of being inclusive of one another in meanings of contents of said figure elements, and a relationship of being equivalent to one another in meanings of contents of said figure elements.

23. The apparatus of claim 21, wherein the characteristic quantities includes denotative characteristics.

24. The apparatus of claim 23, wherein said denotative characteristics are obtained by analyzing meanings of words contained in said figure elements.

* * * * *